(12) United States Patent
Ishii

(10) Patent No.: US 7,835,394 B2
(45) Date of Patent: Nov. 16, 2010

(54) DYNAMIC SETTING OF TRANSMISSION SCHEDULER ALGORITHMS

(75) Inventor: Tatsuya Ishii, Minato-ku (JP)

(73) Assignee: NEC Corporation, Tokyo (JP)

( * ) Notice: Subject to any disclaimer, the term of this patent is extended or adjusted under 35 U.S.C. 154(b) by 1422 days.

(21) Appl. No.: 11/256,940

(22) Filed: Oct. 25, 2005

(65) Prior Publication Data

US 2006/0088055 A1      Apr. 27, 2006

(30) Foreign Application Priority Data

Oct. 26, 2004    (JP)    ............... 2004-310806

(51) Int. Cl.
H04J 3/16    (2006.01)

(52) U.S. Cl. ............... 370/468; 370/328; 455/422.1; 455/434; 455/450; 455/464; 455/509; 455/561; 455/562.1

(58) Field of Classification Search ............... 370/468, 370/328; 455/422.1, 561, 562.1, 434, 450, 455/464, 509, 513

See application file for complete search history.

(56) References Cited

U.S. PATENT DOCUMENTS

| | | | |
|---|---|---|---|
| 2002/0090004 A1 | 7/2002 | Rinchiuso | |
| 2002/0197999 A1 | 12/2002 | Wu et al. | |
| 2003/0223429 A1* | 12/2003 | Bi et al. ............... | 370/395.4 |
| 2004/0204108 A1* | 10/2004 | Etkin et al. ............... | 455/562.1 |
| 2004/0235488 A1* | 11/2004 | Choi ............... | 455/452.2 |
| 2005/0195843 A1* | 9/2005 | Ahmed et al. ............... | 370/411 |
| 2006/0088055 A1* | 4/2006 | Ishii ............... | 370/468 |
| 2007/0206623 A1* | 9/2007 | Tiedemann et al. ............... | 370/431 |
| 2007/0286131 A1* | 12/2007 | Wu et al. ............... | 370/337 |

FOREIGN PATENT DOCUMENTS

| | | |
|---|---|---|
| EP | 1443719 A1 | 8/2004 |
| JP | 2000-341292 A | 12/2000 |
| JP | 2003-209887 A | 7/2003 |
| JP | 2003-259431 A | 9/2003 |
| JP | 2004-253828 A | 9/2004 |
| JP | 2004-254286 A | 9/2004 |
| JP | 2005-110070 A | 4/2005 |
| WO | WO 02/100048 A1 | 12/2002 |

OTHER PUBLICATIONS

Ameigeiras P et al. "Performance of packet scheduling methods with different degree of fairness in HSDPA" 2004 IEEE 60th Vehicular Technology Conference, vol. 2, Sep. 26, 2004 pp. 860-864 XP010788512.

Ofuji, Yoshiaki, "Fast Packet Scheduling Algorithm Based on Instantaneous SIR with Constraint Condition Assuring Minimum Throughput" IEICE technical report Communication systems 2002-31, Jun. 21, 2002.

* cited by examiner

Primary Examiner—Ricky Ngo
Assistant Examiner—Luat Phung
(74) Attorney, Agent, or Firm—Sughrue Mion, PLLC

(57) ABSTRACT

According to a scheduler algorithm setting method that is used for scheduling the transmission of packet data that are to be transmitted to mobile stations, a mobile station number threshold value setting unit sets a threshold value for the number of mobile stations that is to be used for determining switching between two scheduler algorithms that have been set. A mobile station counting unit counts the number of mobile stations that are performing communication within the same cell. The scheduler algorithm setting unit compares the number of mobile stations that have been counted with the threshold value, and based on the result of this comparison, selects the appropriate scheduler algorithm, and sets this scheduler algorithm in a scheduler that performs scheduling of transmission of packet data.

9 Claims, 4 Drawing Sheets

DYNAMIC SETTING OF TRANSMISSION SCHEDULER ALGORITHMS

BACKGROUND OF THE INVENTION

1. Field of the Invention

The present invention relates to a radio base station of a mobile communication system that performs packet communication and to a method of setting scheduler algorithms in the radio base station.

2. Description of the Related Art

The demand for high-speed data communication in mobile communication systems has been growing in recent years. In regard to these systems, rapid advances have been made in the standardization and development of HSDPA (High-Speed Downlink Packet Access) technology to realize higher downlink packet communication speeds in W-CDMA, which is a third-generation mobile communication system.

In HSDPA, a radio base station performs scheduling that controls the frequency of transmission of packet data to a plurality of mobile stations in accordance with the radio characteristics of each mobile station in order to improve throughput by means of a user multiplexing effect. Representative scheduler algorithms include the MAX-C/I (Maximum Carrier Interference Ratio) form and the PF (Proportional Fairness) form.

The MAX-C/I form is an algorithm by which scheduling is carried out such that packet data that await transmission are preferentially transmitted to the mobile station having the best radio characteristics from among stations that are the transmission destinations. This method has the capability of increasing the throughput characteristic, but the frequency of transmission of packet data to mobile stations having poor radio characteristics is low.

The PF form is an algorithm used for the transmission of packet data, that await transmission, equally to all mobile stations that the destinations of this packet data. As a result, a certain proportion of transmission opportunities are equally assigned to mobile stations having poor radio characteristics.

The two forms described above are statically set and do not allow dynamic alteration during operation. A system therefore will have a fixed characteristic according to which, once the MAX-C/I form has been set to prioritize improved throughput characteristics, it (the system) will not carry out the transmission of packet data equally to all mobile stations that are the transmission destinations, or it will suffer from degraded throughput characteristics once the PF form has been set to prioritize transmissions equally to all mobile stations.

The present applicants have devised and submitted an application for a method of dynamic operation in which two schedulers, the MAX-C/I form and the PF form, are provided in a radio base station, and in which the required service quality, which is the band required to transmit the packet data, is calculated when there are packet data that are to be transmitted to mobile stations. Scheduling is then carried out using the scheduler algorithm of the PF form when, based on the result of comparing the calculated value and the demanded service quality, i.e., the demanded band, the required service quality is greater than the demanded service quality; and scheduling is carried out using the scheduler algorithm of the MAX-C/I form when the required service quality is less than the demanded service quality. The required service quality is the band quality necessitated by the mobile system. The demanded service quality is the band quality required by the user.

A method for, in accordance with the load on the CPUs of communication devices, changing the encryption algorithms of communication data between communication devices and communication terminals that are connected by way of a network is disclosed in, for example, JP-A-2004-254286.

However, the above-described method of setting scheduler algorithms that employs required service quality and demanded service quality has the drawback that the required service quality must constantly be calculated. In addition, the method disclosed in the above-described patent document has the drawback that the rate of use of CPUs must be measured.

SUMMARY OF THE INVENTION

It is an object of the present invention to provide a radio base station that allows easier dynamic alteration of transmission scheduler algorithms and a method of setting scheduler algorithms in a radio base station.

In the present invention, two scheduler algorithms that are used for scheduling the transmission of packet data that are to be transmitted to mobile stations are first set. A threshold value for the number of mobile stations that is used for switching between these two scheduler algorithms is then compared with the number of mobile stations that perform communication within the same cell, and the appropriate scheduler algorithm is selected based on the result of this comparison.

In this way, the appropriate scheduler algorithm to be used for scheduling transmissions can be set by merely managing the number of mobile stations that are communicating within the same cell, and further, the appropriate scheduler algorithm can be changed dynamically during operation.

The above and other objects, features, and advantages of the present invention will become apparent from the following description with reference to the accompanying drawings which illustrate an example of the present invention.

DETAILED DESCRIPTION OF THE PREFERRED EMBODIMENTS

Figure 1:
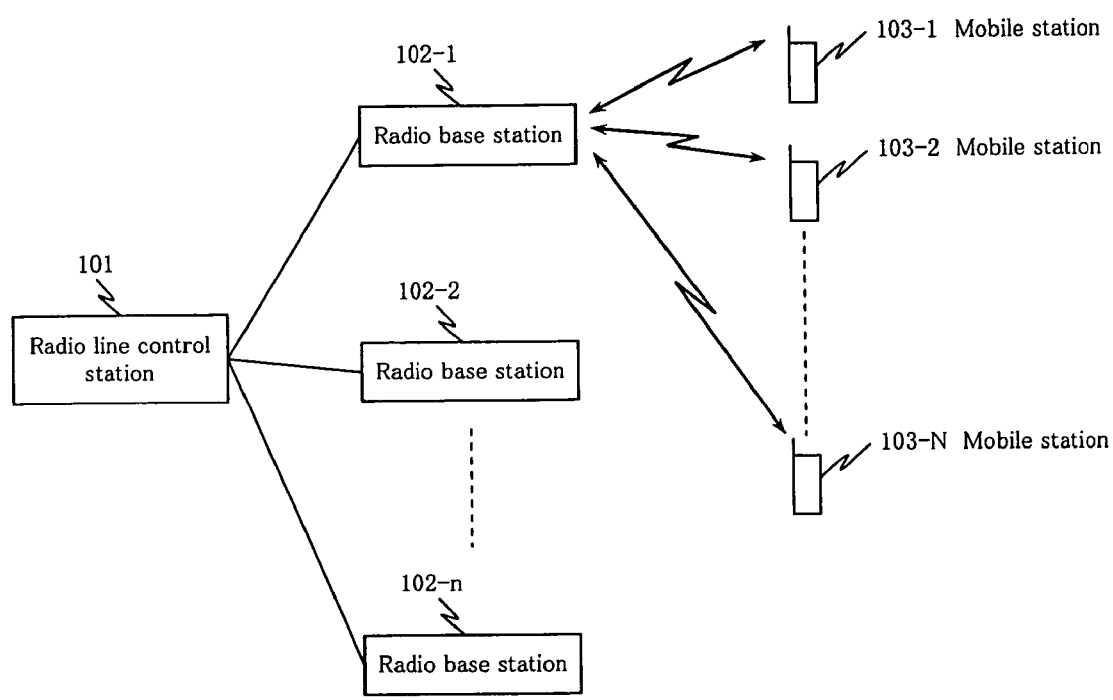
FIG. 1 shows the configuration of a mobile communication system that uses a radio base station according to an embodiment of the present invention.

Referring to FIG. 1, a mobile communication system is shown that is composed of: a plurality of mobile stations 103-1-103-N; a plurality of radio base stations **102-1-102-*n*; and radio line control station 101 for controlling radio base stations 102-1-102-*n*. The plurality of radio base stations 102-1-102-*n* is connected to mobile stations 103-1-103-N by radio links, whereby packet data are transmitted and received between mobile stations 103-1-103-N. In addition, radio line control station 101 is connected to an exchange (not shown), thus enabling the transmission and reception of packet data between mobile stations 103-1-103-N**.

Figure 2:
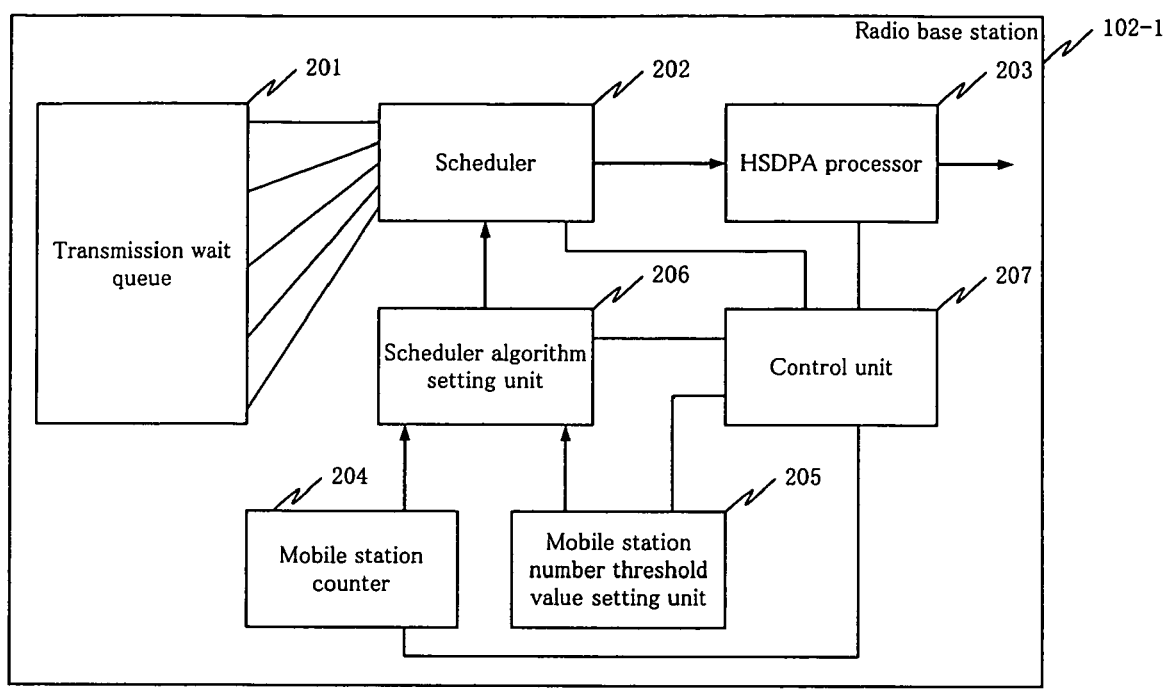
FIG. 2 shows the configuration for controlling the transmission and reception of packet data of the radio base station that is shown in FIG. 1.

As shown in FIG. 2, radio base station 102-1 that is shown in FIG. 1 includes: transmission wait queue 201, scheduler 202, HSDPA processor 203, mobile station counter 204, mobile station number threshold value setting unit 205, scheduler algorithm setting unit 206, and control unit 207 for controlling these components. Radio base stations 102-2-102-n also have the same configuration as radio base station 102-1. Transmission wait queue 201 temporarily stores packet data that are to be transmitted to mobile stations 103-1-103-N. Scheduler 202 performs the scheduling of the transmission of packet data that have been temporarily stored in transmission wait queue 201. HSDPA processor 203 performs HSDPA coding and HARQ processing. Mobile station counter 204 counts the number of mobile stations that are communicating with radio base station 102-1 within a particular cell. Mobile station number threshold value setting unit 205 sets the number of mobile stations that is the threshold value used for determining switching between the scheduling algorithms. Scheduler algorithm setting unit 206 sets the scheduler algorithm based on the number of mobile stations that have been counted in mobile station counter 204 and the threshold value that has been set in mobile station number threshold value setting unit 205. The MAC-hs processor of an HSDPA system of the prior art is composed of transmission wait queue 201, scheduler 202, and HSDPA processor 203.

Figure 3:
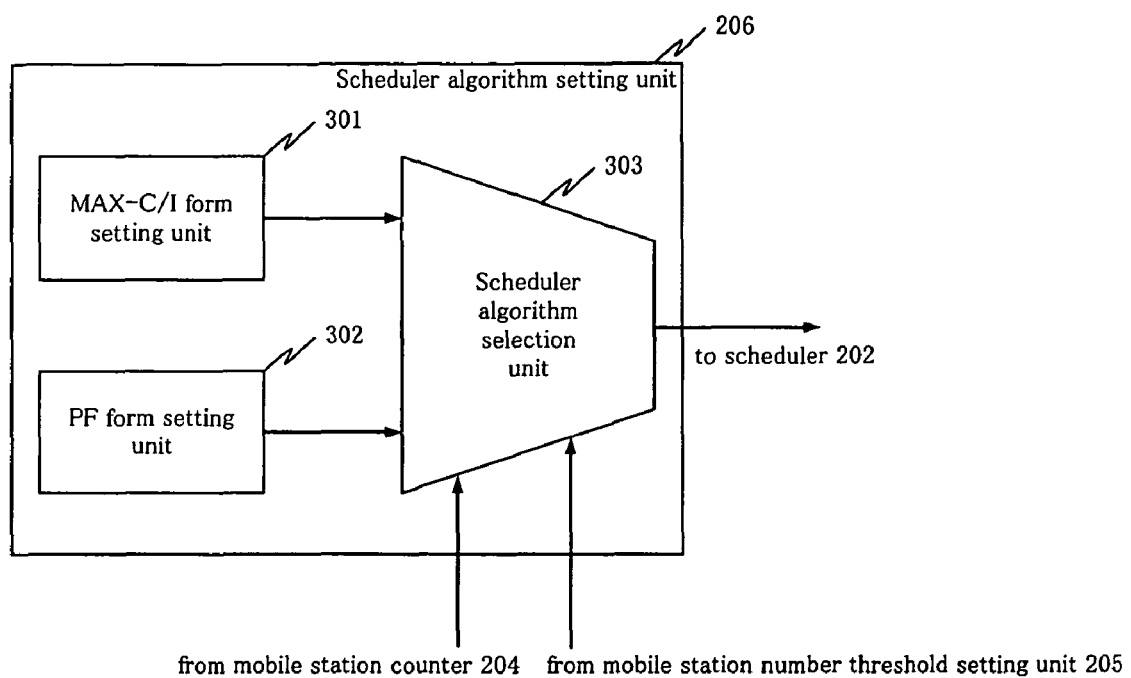
FIG. 3 shows an example of the configuration of the scheduler algorithm setting unit that is shown in FIG. 2.

As shown in FIG. 3, scheduler algorithm setting unit 206 that is shown in FIG. 2 is made up of: MAC-C/I setting unit 301, PF setting unit 302, and scheduler algorithm selection unit 303. MAX-C/I setting unit 301 is a first scheduler algorithm setting means in which the MAX-C/I form is set as the scheduler algorithm. PF setting unit 302 is a second scheduler algorithm setting means in which the PF form is set as the scheduler algorithm. Scheduler algorithm selection unit 303 selects whether to apply the MAX-C/I form or the PF form.

Figure 4:
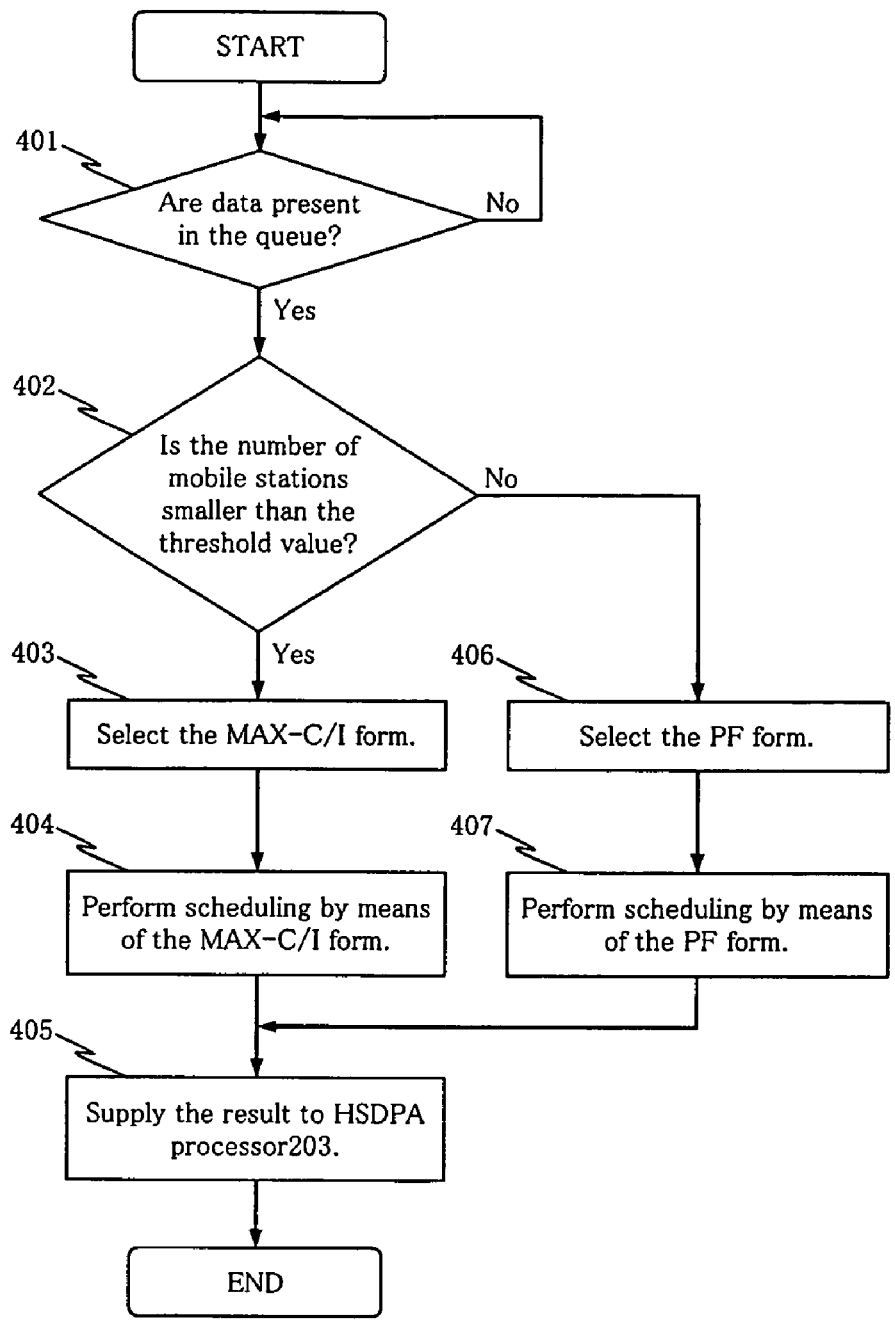
FIG. 4 is a flow chart for explaining the method of setting scheduler algorithms in the radio base station having the configuration that is shown in FIG. 2 and FIG. 3 in the mobile communication system that is shown in FIG. 1.

The following explanation regards the method of setting scheduler algorithms in radio base station 102-1 with reference to FIG. 4.

In Step 401, control unit 207 in radio base station 102-1 constantly monitors whether packet data that are to be transmitted to mobile stations 103-1-103-N are present in transmission wait queue 201. When it has been determined that packet data that are to be transmitted to mobile stations 103-1-103-N are present in transmission wait queue 201, scheduler algorithm selection unit 303 in scheduler algorithm setting unit 206 compares the number of mobile stations 103-1-103-N that are communicating with radio base station 102-1 within the same cell with the threshold value for the number of mobile stations in Step 402.

Here, the number of mobile stations 103-1-103-N that are communicating with radio base station 102-1 within the same cell is supplied as input to scheduler algorithm selection unit 303 in scheduler algorithm setting unit 206 as described below.

The states of mobile stations 103-1-103-N that are communicating with radio base station 102-1 within the same cell are constantly managed in control unit 207. Information indicating the states of mobile stations 103-1-103-N is supplied as output from control unit 207 to mobile station counter 204. In mobile station counter 204, the number of mobile stations 103-1-103-N that are communicating with radio base station 102-1 within the same cell is counted based on the information that has been supplied as input. The value that has been counted is then supplied as output from mobile station counter 204 to scheduler algorithm selection unit 303.

The threshold value for the number of mobile stations is supplied as input to scheduler algorithm selection unit 303 in scheduler algorithm setting unit 206 as described below.

The threshold value for the number of mobile stations is set either in mobile station number threshold value setting unit 205 as input from the outside in advance or in mobile station number threshold value setting unit 205 from control unit 207 by activation of a program that has been stored in advance in control unit 207, and then is supplied as output from mobile station number threshold value setting unit 205 and supplied as input to scheduler algorithm selection unit 303.

When, as a result of the comparison in Step 402, the number of mobile stations 103-1-103-N that are communicating with radio base station 102-1 within the same cell is determined by scheduler algorithm selection unit 303 to be smaller than the threshold value for the number of mobile stations, the MAX-C/I form, which is the scheduler algorithm that has been set in advance in MAX-C/I setting unit 301, is selected by scheduler algorithm selection unit 303 in Step 403.

The MAX-C/I form that has been selected in scheduler algorithm selection unit 303 is then supplied as output to scheduler 202. Scheduler 202 then uses the MAX-C/I form that has been supplied in Step 404 to carry out appropriate scheduling for the packet data of mobile stations 103-1-103-N that is appropriate for transmission wait queue 201. The packet data that have undergone scheduling are then supplied as output to HSDPA processor 203 in Step 405.

In other words, when there is a surplus of radio line resources, control is implemented such that the MAX-C/I form is used to carry out scheduling and packet data are preferentially transmitted to mobile stations having the best radio characteristics.

On the other hand, when, as a result of the comparison in Step 402, the number of mobile stations 103-1-103-N that are communicating with radio base station 102-1 within the same cell is determined by scheduler algorithm selection unit 303 to be not smaller than the threshold value for the number of mobile stations, the PF form, which is the scheduler algorithm that has been set in advance in PF setting unit 302, is selected by scheduler algorithm selection unit 303 in Step 406.

The PF form that has been selected in scheduler algorithm selection unit 303 is then supplied as output to scheduler 202. The PF form that has been selected is used by scheduler 202 in Step 407 to implement appropriate scheduling for the packet data of mobile stations 103-1-103-N that is appropriate for transmission wait queue 201. The packet data that have undergone scheduling are then supplied as output to HSDPA processor 203 in Step 405.

In other words, when the number of mobile stations that are communicating with radio base station 102-1 within the same cell is large and there is no surplus of radio line resources, control is implemented such that scheduling is carried out using the PF form and packet data are transmitted equally to all mobile stations.

On the other hand, if it is determined in Step 401 that packet data that are to be transmitted to mobile stations 103-1-103-N are not present in transmission wait queue 201, control unit 207 continues to constantly monitor transmission wait queue 201 until there are packet data that are to be transmitted to mobile stations 103-1-103-N.

Packet data that are subsequently supplied as input to HSDPA processor 203 are transmitted by way of radio links to mobile stations 103-1-103-N that are the transmission destinations.

In the present embodiment, explanation has been given in regard to the operation of only radio base station 102-1 of radio base stations 102-1-102-*n* that are shown in FIG. 1, but the same operations are carried out in radio base stations 102-2-102-*n*.

In the present embodiment, explanation has also been given regarding a case in which the MAX-C/I form and the PF form were the scheduler algorithms used in scheduling, but the use of other scheduler algorithms can be considered.

In addition to HSDPA, the above-described Method can also be applied to systems such as EUDCH.

While a preferred embodiment of the present invention has been described using specific terms, such description is for illustrative purposes only, and it is to be understood that changes and variations may be made without departing from the spirit or scope of the following claims.

What is claimed is:

1. A radio base station comprising:
a transmission wait queue for temporarily storing packet data that are to be transmitted to mobile stations that are performing communication within a same cell;
mobile station counting means for counting a number of mobile stations that are performing communication within said same cell;
a first scheduler algorithm setting means in which a first scheduler algorithm has been set;
a second scheduler algorithm setting means in which a second scheduler algorithm has been set;
mobile station number threshold value setting means in which a threshold value for the number of mobile stations has been set for determining switching between said two scheduler algorithms;
a scheduler algorithm selection means for performing a comparison between said threshold value and the number of mobile stations counted by said mobile station counting means, and, based on a result of the comparison, selecting a scheduler algorithm from among said first scheduler algorithm and said second scheduler algorithm; and
a scheduler for using the selected scheduler algorithm to perform scheduling of transmission to said mobile stations of said stored packet data.

2. The radio base station according to claim 1, wherein a Maximum Carrier Interference Ratio form is set in said first scheduler algorithm setting means and a Proportional Fairness form is set in said second scheduler algorithm setting means.

3. The radio base station according to claim 1, wherein said scheduler algorithm selection means selects said first scheduler algorithm when said number of mobile stations is smaller than said threshold value, and otherwise selects said second scheduler algorithm.

4. A method for setting a scheduler algorithm in a radio base station that performs scheduling of transmission of packet data that have been temporarily stored in a transmission wait queue and that transmits said packet data to mobile stations that are performing communication within a same cell; said method comprising steps of:
counting a number of mobile stations that are performing communication within said same cell;
comparing said number of mobile stations with a threshold value for the number of mobile stations for determining switching between a first scheduler algorithm and a second scheduler algorithm that have been set in advance;
based on a result of the comparing, selecting a scheduler algorithm from among said first scheduler algorithm and said second scheduler algorithm; and
using said selected scheduler algorithm to perform scheduling of the transmission of said packet data.

5. The method according to claim 4, wherein said first scheduler algorithm is a Maximum Carrier Interference Ratio form, and said second scheduler algorithm is a Proportional Fairness form.

6. The method according to claim 4, comprising a step of selecting said first scheduler algorithm when the number of said mobile stations is smaller than said threshold value, and otherwise selecting said second scheduler algorithm.

7. A radio base station comprising:
a transmission wait queue for temporarily storing packet data that are to be transmitted to mobile stations that are performing communication within a same cell;
a mobile station counting circuit which counts a number of mobile stations that are performing communication within said same cell;
a mobile station number threshold value setting circuit which sets a threshold value for the number of mobile stations to determine switching between a first scheduler algorithm and a second scheduler algorithm;
a scheduler algorithm selection circuit which performs a comparison between said threshold value and the number of mobile stations counted by said mobile station counting circuit, and, based on a result of the comparison, selects a scheduler algorithm from among said first scheduler algorithm and said second scheduler algorithm; and
a scheduler which schedules transmission of said stored packet data to said mobile stations using the selected scheduler algorithm.

8. The radio base station according to claim 7, wherein said first scheduler algorithm is a Maximum Carrier Interference Ratio form and said second scheduler algorithm is a Proportional Fairness form.

9. The radio base station according to claim 7, wherein said scheduler algorithm selection circuit selects said first scheduler algorithm when said number of mobile stations is smaller than said threshold value, and otherwise selects said second scheduler algorithm.

* * * * *